United States Patent [19]

Lievre

[11] Patent Number: 4,769,702
[45] Date of Patent: Sep. 6, 1988

[54] METHOD FOR THE COMPRESSION OF DIGITAL IMAGES AND DEVICE FOR THE APPLICATION OF A METHOD OF THIS TYPE

[75] Inventor: Gerard Lievre, Ville d'Avray, France

[73] Assignee: Thomson-CSF, Paris, France

[21] Appl. No.: 18,193

[22] Filed: Feb. 24, 1987

[30] Foreign Application Priority Data

Feb. 28, 1986 [FR] France ................... 8602872

[51] Int. Cl.[4] ............................. H04N 7/12
[52] U.S. Cl. .................... 358/133; 358/13; 358/75; 358/80
[58] Field of Search ............ 358/13, 75, 80, 133

[56] References Cited

U.S. PATENT DOCUMENTS

| | | | |
|---|---|---|---|
| 4,639,769 | 1/1987 | Fleisher | 358/22 |
| 4,654,720 | 3/1987 | Tozawa | 358/75 |
| 4,677,465 | 6/1987 | Alkofer | 358/75 |

FOREIGN PATENT DOCUMENTS 0117161 6/1984 European Pat. Off. .

OTHER PUBLICATIONS

Metwali et al., "Stored Patterns, etc.", 1981, pp. 92–96, IEEE Int. Symposium on Circuits and Systems Proc.
Gersho et al., "Adaptive Vector, etc.", 1985, pp. 133–136, ICASSP Proc., IEEE Conf. on Acoustics, Speech and Signal Proc.
Lowitz, "Compression des Donnees Images, etc.", 1978, pp. 700–713, AFCET-IRIA, Paris, France.

Primary Examiner—Howard W. Britton
Attorney, Agent, or Firm—Marmorek, Guttman & Rubenstein

[57] ABSTRACT

The invention pertains to a method and a device for the compression of digital images, the image being made up of a set of pixels, these pixels being assembled in classes, the number of which is predetermined, the method consisting in the creation, during the analysis of the image and each time that a pixel does not belong to the classes already created, a class to which the pixel would belong, this class being created on the basis of the radiometric characteristics of the pixel analyzed.

6 Claims, 2 Drawing Sheets

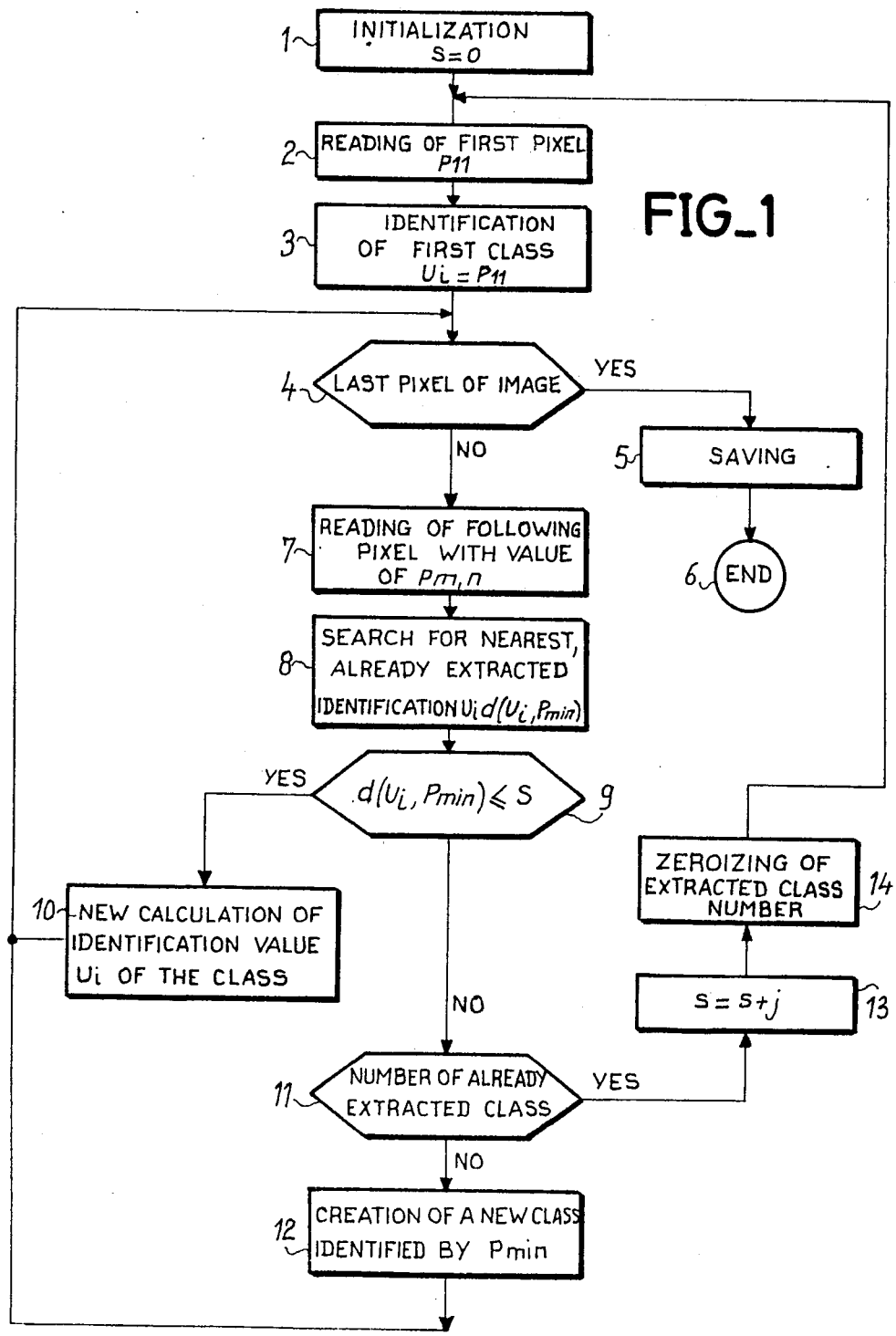

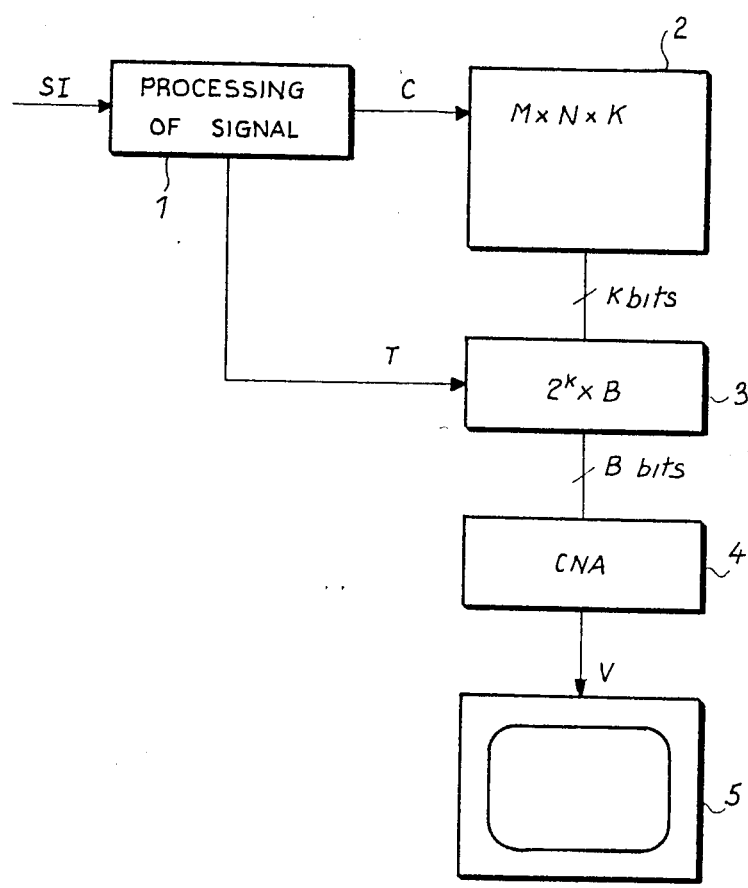
FIG_2

METHOD FOR THE COMPRESSION OF DIGITAL IMAGES AND DEVICE FOR THE APPLICATION OF A METHOD OF THIS TYPE

BACKGROUND OF THE INVENTION

1. Field of the Invention

The invention pertains to a method for the compression of digital images and, more especially, to a method for the compression of digital images intended to be televised. It also pertains to a device for the application of a method of this type.

2. Description of the Prior Art

Television images comprise pixels which are evenly distributed in the plane of the image, pixels to which one or more radiometric qualities, called components, are assigned.

These components may be, for example, the measurements of the radiometric characteristics $R_i$, $V_i$, $B_i$ of each pixel in the case of three channels, red, green and blue, for a color image or radiometric measurements of each pixel in the case of only one channel for black and white images.

The digitalization of an image for its processing or transmission conventionally consists in the encoding of each pixel in a number B of bits. The total digital volume representative of an image is equal to $N \times M \times B$ bits, M being the number of image lines and N the number of pixels per line.

In certain applications it is absolutely necessary to use small-sized memories. It is therefore necessary to reduce, as far as possible, the volume of the digital information which has to be stored in these memories.

For this, techniques such as differential encoding or orthogonal transformations or statistical encoding have been experimented with, but have not given very satisfactory results. For these techniques do not make it possible to obtain a high compression rate without the deterioration of the images after they are restored.

Besides, it is known that, to obtain an image compression rate, the pixels are assembled, according to a predetermined criterion, into classes, the number of classes being smaller than the number of combinations of encoding bits of a pixel in order to obtain a comression.

It is also known that, to obtain a compression, the image is fictitiously cut up into windows and that the number of classes are fixed on an a priori basis for each window. Each class is identified by a predetermined value. The application of an assembling criterion to each pixel makes it possible to assign this pixel to one of these classes. When all the pixels of a window have been classified, it is usual to calculate a vector, for example, by calculating the center of gravity for each class so as to identify each class by a new vector in order to improve the precision.

This type of image analysis remains, all the same, unsuited to certain applications. For window-by-window processing cannot be warranted for all applications, especially for applications in which the images have few shades. Besides such processing requires previous analysis of the image in order to determine each vector which will make it possible to identify a class. This preliminary study can make it possible to determine the initial radiometric values used to create each class.

SUMMARY OF THE INVENTION

The present invention makes it possible to correct these disadvantages and, to this end, it proposes a method for the compression of digital images in which each class is identified while the image is being analyzed.

A special object of the present invention is a method for the compression of digital images, the image being made up of a set of pixels, these pixels being assembled in classes, the number of which is predetermined, a method which consists in creating, during the analysis of the image and each time that a pixel does not belong to the already created classes, a class to which the pixel will belong, this class being created on the basis of the radiometry of the pixel analyzed.

Another object of the present invention is a device for the application of the method, comprising a processing unit which receives the digital image signal SI and delivers a compressed digital image signal C, each pixel being encoded in K bits and a digital signal T corresponding to the encoding in B bits of $2^K$ classes; an image memory with a volume of $M \times N \times K$ bits in which the data of the signal C are stored and a transcoding memory, the volume of which is $2^K \times B$ bits; a digital-analog convertor which receives the signal from the transcoding memory and transforms it into an analog signal which is displayed on the screen.

DESCRIPTION OF THE DRAWINGS

The invention will be better understood from the following detailed description, given as a non-exhaustive example, and illustrated by:

FIG. 1 which develops the stages of the method according to the invention, and

FIG. 2 which depicts a device for applying the method according to the invention.

DESCRIPTION OF THE PREFERRED EMBODIMENT

The present invention therfore pertains to the reduction of the volume of the information needed to depict digitalized monochrome or color images.

In a digital image defined by M lines with N pixels per line, if the vector representing each pixel (this vector may consist of one component or the mean of the radiometric components) is encoded in B bits, then the image occupies a volume of $M \times N \times B$ bits. Encoding in B bits makes it possible to obtain $2^B$ values defining an image. The number of these values can be reduced without, however, damaging the quality of the image. The method, for this, consists in setting a number $2^K$ of classes in which the vectors meeting the criteria of belonging to a class will be distributed. The number K is chosen as less than B. The compressed image is associated with a transcoding table of $2^K \times B$ bits. Each pixel is therefore identified by a code in K bits which makes it possible to identify the class to which it belongs, the radiometric value of the class being encoded in B bits.

The image thus transformed occupies a volume of digital information of $M \times N \times K + 2^K \times B$ bits. The information compression factor, which is equal to $M \times N \times B / (M \times N \times + 2^K \times B)$ is about six for $M = N = 1024$, $B = 24$ and $K = 4$.

The method consists in creating the classes during the analysis by identifying them, each class being created whenever a pixel does not belong to the classes already created.

FIG. 1 depicts the various stages of the method.

This method uses a parameter S which changes in such a way as to determine the boundary of each class for the class number on which the operation is fixed. This parameter S represents the radius of a class around the radiometric value $U_i$ which represents it. This radius depends on the maximum number of classes taken as the limit. The greater the number of classes, the smaller is the radius.

The digital value of a vector corresponding to a pixel has been defined by $P_{m,n}$.

The digital value of the $ii^{th}$ vector identifying an $i^{ith}$ class has also been defined by $U_i$.

The criterion of proximity used to assemble the pixels in a given class is, for example, the Euclidian distance defined in monochrome by the expression:

$$d(U_i, P_{m,n}) = |U_i - P_{m,n}|$$

In the case of color images, the expression of the distance becomes:

$$|d(U_i, P_{m,n})|^2 = (R_i - R_{m,n})^2 + (V_i - V_{m,n})^2 + (B_i - B_{m,n})^2$$

where $R_i, V_i, B_i$, are the digital values of the three components determined for the class $U_i$; $R_{m,n}, V_{m,n}, B_{m,n}$ are the digital values of the three components of the pixel tested.

The method contains the steps numbered 1 to 14:

1. At the initialization of the method, the parameter S is nil;
2. A reading is made of the first pixel $P_{11}$;
3. The first class is identified by the value of the first pixel;
4. A test is made to find out whether it is the last pixel of the image;
5. If it is the last pixel: the radiometries of the pixels and the radiometries of the classes created are saved;
6. End of processing and transmission of compressed signal to reconstitute the image;
7. If it is not the last pixel: the following pixel with a value $P_{m,n}$ is read;
8. The already extracted, nearest identification $U_i$ is sought by calculating the distance $d(U_i, P_{m,n})$;
9. A comparison is made between this distance d and the parameter S;
10. d is equal to or less than S: the pixel is inserted into the class $U_i$, and the identification value $U_i$ of this class is re-calculated;
11. d is greater than S: a new class must be created and a test is made to find out if the number of classes already extracted is equal to or greater than $2^K$;
12. The number of classes is smaller than $2^K$: a new class is created identified by the value of the pixel read $P_{m,n}$ and the operation is repeated starting from the fourth step;
13. The number of classes is equal to $2^K$: no new class should be created, the parameter S is increased by increments such that $S = S + j$;
14. The number of classes extracted is zeroized and the operation is repeated starting from step 2.

The parameter S develops by increases by increments of a value j which represents a multiple of the smallest increment possible between two digital representations of pixels. If a representation of values of pixels is considered in whole numbers, we can take $j = 1$.

Each time that the distance between a value $P_{m,n}$ and the nearest, already extracted value $U_i$ is smaller than or equal to the current parameter S, the value $P_{m,n}$ of the pixel belongs to this class. The identification $U_i$ of this class is recalculated by the following expression:

$$(U_i)_{t+1} = \frac{t \times (U_i)_t + P_{m,n}}{t + 1}$$

where t represents the number of pixels that have been classified in this class before the test in progress and $(U_i)_t$ represents the value identifying the class by the t pixels.

This new value corresponds simply to an arithmetical mean of the values of the pixels used to identify the class at the instant considered.

When the distance is greater than the current parameter S, it means that a new class must be created. Now before creating a new class, it must be seen to it that the number of classes allowed is not reached. If this number is reached, no more classes should be created but S must be increased by increment. If the number is not reached, a new class is created and all the values thus classified are saved as soon as there are no more pixels to be analyzed.

The device for applying the method comprises a processing unit 1 to process the digital signal SI, this signal representing the digital encoding of a televised image.

The processing unit 1 makes it possible, after all the pixels are assembled in the $2^K$ classes created, to replace the value of each image pixel, defined in B bits, by the code in K bits identifying the nearest class. The signal C which is delivered by the unit 1 and corresponds to the image thus processed, is stored for example in an image memory 2, with $M \times N \times K$ bits, in which the data represent the image encoded in K bits per pixel, and in a memory of $2^K \times B$ bits corresponding to a transcoding tabl representing the image which is encoded in B bits, reduced to $2^K$ radiometric values and displayed.

The signal read in the memory 3 is converted by a digital-analog converter 4 to transform the signal into an analog signal, this signal being the video signal V which is displayed on the television screen 5.

In this special embodiment, the processing is done by a computer programmed for this purpose. The computer is, for example, a THOMSON-CSF 68000 microprocessor.

What is claimed is:

1. A method for compressing a digital image made up of pixels by assembling said pixels into classes, said method comprising, sequentially testing said pixels as follows, (i) if the distance (d) between the pixel being texted and the nearest identifying value ($U_i$) of an already existing class is less than a parameter (S), inserting the pixel being tested into the class characterized by the nearest identifying value ($U_i$), (ii) if the distance (d) between the pixel being tested and the nearest identifying value ($U_i$) is larger than the parameter S and the number of classes is less than a predetermined number, forming a new class for said pixel, (iii) if the distance (d) between the pixel being tested and the nearest identifying value ($U_i$) is larger than the parameter S and the number of classes is equal to said predetermined number, incrementing the parameter S and retesting the previously tested pixels.

2. The method of claim 1 wherein said method if initiated with the parameter S being set to zero and wherein the position of the first pixel to be tested serves as the identifying value of the first class to be formed.

3. The method of claim 1 wherein the identifying value ($U_i$) of each class is the average position of the pixels in the class.

4. The method of claim 3 wherein the identifying value ($U_i$) of each class is recalculated when a pixel is added to the class.

5. A method for compressing a digital image comprising pixels by forming up to $2^K$ classes, each of said classes having a radiometric identifying value $U_i$, said method comprising
  (1) setting a parameter S to zero
  (2) reading a first pixel having radiometric position $P_{11}$
  (3) forming a first class having a radiometric identifying value $U_i$ set equal to $P_{11}$
  (4) reading an additional pixel having radiometric position $P_{mn}$
  (5) calculating the distance d between the nearest radiometric identifying value $U_i$ of an already existing class and comparing the distance d with the parameter S
  (6) if d is equal to or less than S, inserting the pixel into the class having the identifying value $U_i$ and reclaculating the value $U_i$,
  (7) if d is greater than S, determining if the number of classes already formed is less than or equal to $2^K$,
  (8) if the number of classes formed is smaller than $2^K$, forming a new class whose identifying value $U_i$ is set equal to the value $P_{mn}$ of the last read pixel, and the operation is repeated starting from step (4) above unless the last read pixel is the last pixel of the image in which case the radiometric values of the pixels and the radiometric identifying values of the classes are stored,
  (9) if the number of classes already formed is equal to $2^K$ no new class is created, the parameter S is incremented and the process is repeated starting from step (2) above.

6. A device for compressing a digital image composed of $N \times M$ pixels, each of said pixels being represented by B bits, said device comprising
  a processing unit for receiving said digital image signal and for delivering a compressed digital image signal comprising pixels encoded in K bits and a digital signal corresponding to the encoding of $2^K$ classes in B bits,
  an image memory with a volume of $M \times N \times K$ bits in which said compresed digital image is stored,
  a transcoding memory having a volume of $2^K \times B$ bits for storing the digital signal corresponding to the encoding of said classes, said transcoding memory being adapted to receive a signal comprising $M \times N \times K$ bits from said image memory and to transmit a signal comprising $M \times N \times B$ bits,
  an analog-to-digital converter connected to said transcoding memory, for converting said $M \times N \times B$ bit signal from said transcoder memory to analog form from display on a screen,
  said processor being adapted to compress said digital image by organizing said pixels ito said $2^K$ classes by sequentially processing said pixels as follows:
  (i) if the radiometric distance (d) between the pixel being processed and an identifying value $U_i$ of an already existing class is less than a parameter (S), inserting the pixel beig processed into the class characterized by the nearest identifying value,
  (ii) if the distance (d) between the pixel beig processed and the nearest identifying value ($U_i$) is larger than the parameter (S) and the number of existing classes is less than $2^K$, forming a new class for said pixel,
  (iii) if the distance (d) between the pixel beig processed and the nearest identifying value ($U_i$) is larger than the parameter (S) and the number of existing classes is equal to $2^K$, incrementing the parameter (S) and retesting the previously tested pixels.

* * * * *